Sept. 13, 1960 M. STIMLER 2,952,464

SOUND TRACK SELECTION PHONOGRAPH

Filed Dec. 22, 1959 3 Sheets-Sheet 1

INVENTOR.

Morton Stimler

INVENTOR.
Morton Stimler

SOUND TRACK SELECTION PHONOGRAPH

Filed Dec. 22, 1959 3 Sheets-Sheet 3

INVENTOR.

Morton Stimler

United States Patent Office 2,952,464

Patented Sept. 13, 1960

2,952,464

SOUND TRACK SELECTION PHONOGRAPH

Morton Stimler, 8308 14th Ave., Hyattsville, Md.

Filed Dec. 22, 1959, Ser. No. 861,342

15 Claims. (Cl. 274—15)

This invention relates to a phonograph record player and more particularly to a system for selecting at will a desired sound track from a plurality of discrete sound tracks on a record and for playing the selected sound track. Heretofore it has been necessary to manually place the pickup arm stylus at the desired position on a record when the listener desired to select a particular sound track portion of the record for reproduction of the sound recorded thereon.

There are several disadvantages to the method heretofore employed for selecting a desired sound track, one of which is that accurate manual location of the stylus at a particular selected portion of the record is difficult. Another disadvantage is the possibility of damage to the record by scratching or accidentally dropping the pickup arm on the record. Still another disadvantage is the possibility of damage to the pickup stylus.

In accordance with the present invention this selection of a particular sound track of the record is obtained by merely setting a selector knob on the phonograph to a position corresponding to the sound track desired, as will more clearly appear as the description proceeds.

One of the objects of this invention is to employ a beam of light reflected from a small portion of a record for controlling the selection of a desired sound track thereon.

Another object is to employ the different intensities of a beam of light reflected from modulated and unmodulated portions of a record during a scanning operation thereof to control the selection of a desired sound track.

Another of the objects of this invention is the provision of new and improved means for selecting for playback a desired sound track of a phonograph record having a plurality of sound tracks in discontinuous spaced adjacency arranged thereon.

Another object is a new and improved system for selecting a desired sound track of a plurality of discrete sound tracks on a phonograph record for playback and for setting the phonograph into operation under control of the selecting means.

A further object is to provide manually controlled means for resetting at will the selecting means prior to or during a selecting operation.

A still further object is the provision of new and improved means for selectively raising, lowering and moving the tone arm of a phonograph to a selected playing position.

Another object is to provide new and improved means for placing the pickup stylus at the beginning of a first sound track regardless of the record diameter.

Other objects and many of the attendant advantages of this invention will be readily appreciated as the same becomes better understood by reference to the following detailed description when considered in connection with the accompanying drawings wherein.

Figures 1, 2, 7:
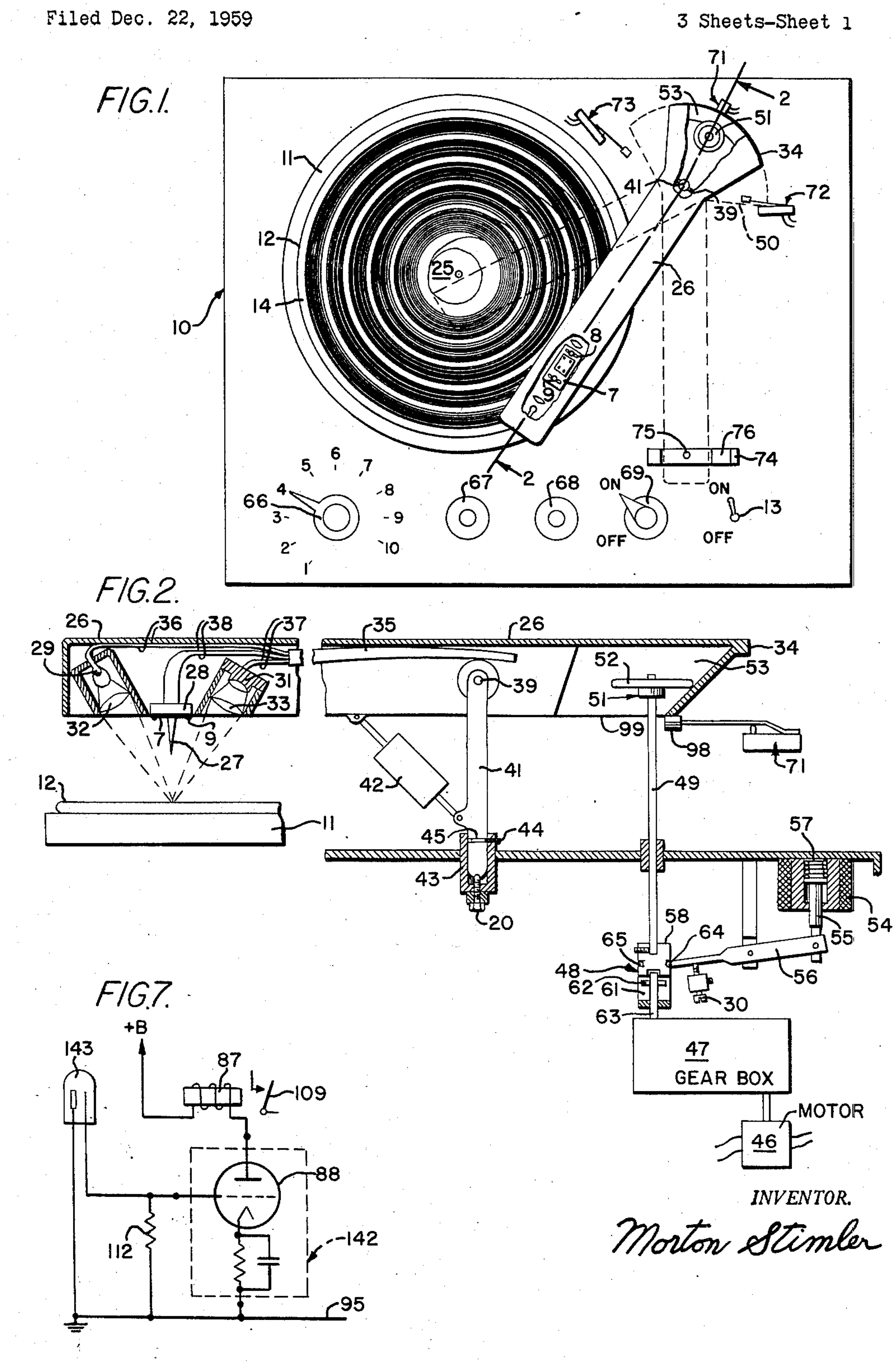
Fig. 1 is a plan view partially broken away of a phonograph with the pickup tone arm thereof in a scanning position and employing the device of the present invention according to one embodiment thereof.
Fig. 2 is a sectional view in elevation and somewhat enlarged taken along the line 2—2 of Figure 1.
Fig. 7 is a circuit of an alternative form of photoelectric cell for use with the schematic of Fig. 6.
Figure 3:
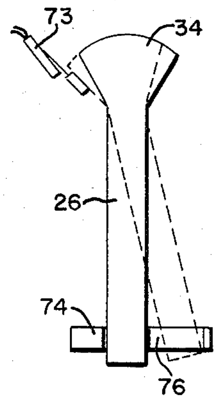
Fig. 3 is a plan view of the tone arm in an initial rest position, the tone arm being shown in dashed outline at the completion of the return swing from a playing position.
Figure 4:
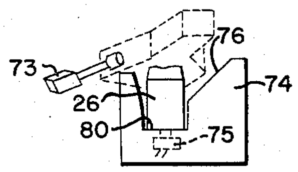
Fig. 4 is an end view somewhat in perspective of the device of Figure 3.

Referring now to the drawings on which like numerals of references are employed to designate like parts throughout the several views and more particularly to Figs. 1 and 2, there is shown thereon a phonograph designated generally by the numeral 10 having a turntable 11 carrying a phonograph record 12. The phonograph record is provided with a plurality of discrete sound tracks 15—19, Fig. 5, preceded by an unmodulated outer space 14 upon which the stylus is generally placed to play the first sound track of a record in a normal playback operation. The outer space 14 usually comprises an unmodulated spiral groove which serves to guide the tone arm stylus inwardly to the outermost convolution of the outermost first sound track. The unmodulated spaces separating the discrete sound tracks are designated 21—24 respectively, the innermost unmodulated space being designated by the numeral 25, as most clearly shown on Fig. 5. All of the unmodulated spaces comprise an unmodulated groove for guiding the tone arm stylus from the end of one sound track to the next sound track or the innermost unmodulated space 25. A tone arm 26 is provided with a conventional pickup stylus 27, a pickup element 28 and an optical system comprising a light projector 29, a photoelectric cell 31 and two focusing lenses 32 and 33 arranged in such manner as to focus a beam of light, as shown on Fig. 2 by the dotted lines, from the projector onto the photocell by reflection of the light beam from the surface of the record beneath the stylus when the tone arm is in its raised scanning position. Both the projector and the photoelectric cell are housed preferably within the pickup arm in such manner as to exclude light rays except those passing through the optical system associated therewith. The pickup element is mounted on a plate 7 which may be positioned laterally with respect to the focused beam of light by means of the slots 8 and locking screws 9 substantially as shown in Fig. 1. The tone arm is also provided with an arcuate portion 34 having a frusto-conical surface 53 which may be roughened if desired, and an electrical cable 35 containing a pair of wires 36 connected to the projector, a second pair of wires 37 connected to the photocell and a third pair of wires 38 connected to the pickup element 28. The tone arm is arranged to pivot vertically, for raising and lowering thereof, about a pin 39 disposed transversely within a shaft 41. The tone arm is also arranged to pivot horizontally about the axis of shaft 41 in tone arm scanning, positioning and record playing to be more fully described. The tone arm is linked to the shaft 41 by a dash pot 42 which rotates with the tone arm. The shaft is pivotally supported by bushing 43 for rotation about an axis parallel to the axis of rotation of the record. A set screw 44 in the bushing 43 projects into the groove 45, Fig. 2, thereby preventing the shaft 41 from being inadvertently lifted out of the bushing. Two adjustment screws 20 and 30 are provided for a fine adjustment of the tone arm for optimum focusing of the light beam on the surface of the record when the tone arm is in its raised scanning position. A reversible tone arm motor 46 serves to actuate the tone arm by rotation about the axis of shaft 41. This is effected through a speed reduction gear box 47, a conventional coupling mechanism 48, driving shaft 49 and driving wheel assembly 51 when the friction ring 52 thereof is in engagement with the frustoconical surface 53 of the arcuate portion of the tone arm during a scanning and positioning operation, Fig. 2, said frustoconical surface having an axis in coincidence with the axis of shaft 41. The friction or driving ring may be composed of a frictional material such, for example, as rubber or any of the synthetic varieties thereof suitable for the purpose. A solenoid 54 acting through a plunger 55, link 56 and the coupling mechanism 48 serves to engage and disengage the friction ring and frustoconical surface and thereby to raise and lower the tone arm selectively by pivotal movement thereof about the pin 39. When the solenoid is deenergized a compressed spring 57 maintains the solenoid plunger in its extended position, the driving wheel assembly in its raised position and the tone arm in a lowered position, disengaged therefrom. The mass distribution of the tone arm assembly is designed such that the gravitational force acting thereon is just sufficient to cause the tone arm to move from a raised position to a lowered position when the driving wheel is disengaged from the frustoconical surface thereof, and without damage to the stylus or the record and to maintain the proper pressure of the stylus against the record during a playing operation thereof. A housing 58 provided with a transverse slot 61 is connected to driving shaft 49. A pin 62 extending through the gear box output shaft 63 rides in the slot 61 permitting the housing 58 to be raised and lowered by the action of the ball 64 on the end of link 56 in the groove 65, regardless of whether the solenoid is operated or deenergized. Also, provided, substantially as shown in Fig. 1, are a sound-track-selector switch 66, a start switch or button 67, a reject switch or button 68, an alarm On-Off switch 13, a conventional On-Off volume control 69, a tone-arm-motor-start microswitch 71, actuated when the tone arm 26 is in its raised position, an end-of-record-tone arm return microswitch 72 and an end-of-return-disconnect microswitch 73. Shown most clearly in Figs. 1, 3, and 4, are the tone arm rest element 74 and the rest-position-disconnect microswitch 75 whose contacts are open when the tone arm is in the initial rest position thereon.

The tone arm rest 74 is provided with a sloping cam surface 76 which serves to engage and guide the tone arm during movement of the tone arm from a raised position at the extreme end-of-return to a rest position in engagement with surface 80 of the tone arm rest. The raised end-of-return position of the tone arm is illustrated on Figs. 3 and 4 in dashed outline and the final rest position of the tone arm is shown in solid lines. When the tone arm is in its extreme end-of-return position, an outer surface on the arcuate portion of the tone arm engages the normally closed microswitch 73 sufficiently to cause momentary operation thereof to an open position. As the tone arm is released by upward movement of the driving wheel, in response to the release of solenoid 54, the tone arm is lowered and engages the sloping surface 76 and, by cam action therewith moves reversely about the axis of shaft 41 sufficiently to come to a rest position in engagement with surface 80 of the tone arm rest thereby releasing switch 73 and concurrently therewith actuating rest-position microswitch 75 to an open position. This reverse movement of the tone arm is sufficient to prevent spurious operation of the switch 73 as the tone arm is raised on the next succeeding selecting operation of the device.

Figure 6:
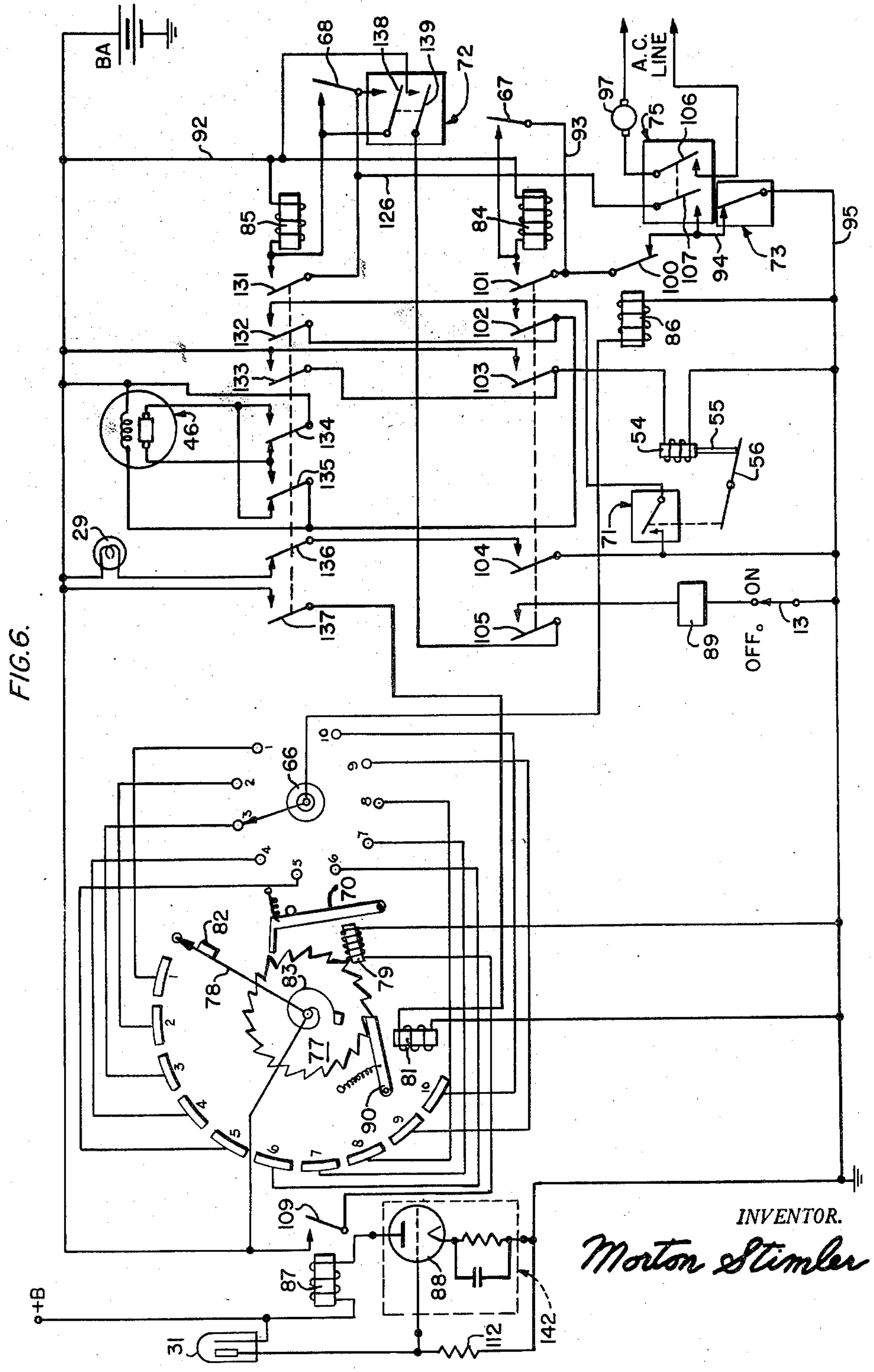
Fig. 6 is a schematic diagram of a system suitable for use with the present invention.

Apparatus and circuit connections therebetween suitable for controlling the setting of the tone arm to a desired position for playing a preselected sound track of the record are shown in schematic form on Fig. 6, the apparatus comprising a stepping switch or counter, indicated generally by the numeral 77, having a wiper arm 78 settable to different contact positions by a stepping magnet 79. The switch may be of any well known type suitable for the purpose and provided with a reset magnet 81 operable to unlatch the wiper arm assembly and cause the wiper arm to be restored quickly to an initial home position in engagement with stop 82 by spring 83. The manual selector 66 settable to engagement with any contact of a consecutively numbered bank of electrical contacts, Figs. 1 and 6, thereby to select a circuit from the manually selected switch contact to a corresponding contact of the stepping switch. Three control relays 84, 85, and 86 are also provided, the purpose of which will become more clearly apparent as the description proceeds. A stepping switch control relay 87 in the output circuit of a gating device and amplifier 142 shown by way of illustration as comprising a triode 88 and controlled by different voltages appearing across resistor 112, Fig. 6, due to the photoelectric cell currents as the record is scanned. An alarm device 89 such, for example, as a light or buzzer, is also preferably provided, the purpose of which will be more clearly apparent as the description proceeds.

The operation of the system of Fig. 6 will now be described. Let it be assumed, by way of example, that a record such as the record 12 having five discrete sound tracks thereon has been placed on the phonograph turntable and it is desired to select the third modulated sound track. The manual selector 66 is now set to position three corresponding to the sound track desired to be selected for playback. The start button 67 is momentarily depressed thereby closing a circuit from battery BA, through conductor 92, winding of start relay 84, make contact of start switch 67 from whence this circuit is continued by way of conductor 93, armature 100 and break contact of relay 86, conductor 94, closed contacts of end-of-return microswitch 73 to the ground on conductor 95 thereby causing relay 84 to operate. When relay 84 operates, relay contacts 101—105 close. Contact 101 is in parallel with the start switch 67 and maintains the start relay energized after the start switch has been released. Contact 102 closes a circuit from battery through the tone arm motor 46 to the normally open tone-arm-motor-start microswitch 71. Contact 103 completes a circuit from battery through solenoid 54 to ground thereby actuating the solenoid and initiating the lifting of the tone arm from its rest position by rotation about the pin 39 through the interaction of the link 56, the coupler 48, the driving shaft 49, the friction rim 52 of the driving wheel 51, and the frustoconical surface 53 of the tone arm, Fig. 2. The contact 104 of relay 84 completes a circuit from battery through the projector lamp 29 to ground thereby illuminating the projector lamp as a light source for the scanning operation. Contact 105 connects the alarm device 89 from ground through the alarm On-Off switch 13 to the normally open contact 139 of the end-of-record microswitch 72. The alarm, however, does not operate at this time for the reason that the circuit thereof is open at the contact 139 of the end-of-record microswitch. When the tone arm is initially raised from its rest position it operates the rest-position-microswitch 75 which results in the closing of contacts 106 and 107 thereof. Closing of contact 106 starts the turntable motor 97 in operation. Closing of contact 107, without effect at this time, makes it possible for the reject relay 85 to operate, as will be more fully described. When the tone arm is fully raised to its scanning position the bottom edge 99 of its arcuate portion 34 as viewed in the drawing, is fully depressed, engaging and closing microswitch 71 thereby completing the power connection to the tone-arm motor which operates causing the tone arm to rotate about the axis of shaft 41 by virtue of the friction rim 52 of the moving drive wheel 51 against the frustoconical surface 53. With reject relay 85 deenergized the contacts 134—135 are so positioned that the direction of rotation of the tone arm motor will swing the tone arm in a forward direction toward the center of the record. Microswitch 71 remains in its closed condition during rotation of the tone arm by reason of the bottom edge 99 pressing against roller 98 of the microswitch as long as the tone arm is maintained in its raised position by the operated solenoid 54, Fig. 2. The microswitches 72 and 73 are preferably equipped with similar rollers to minimize friction during engagement.

Figure 5:
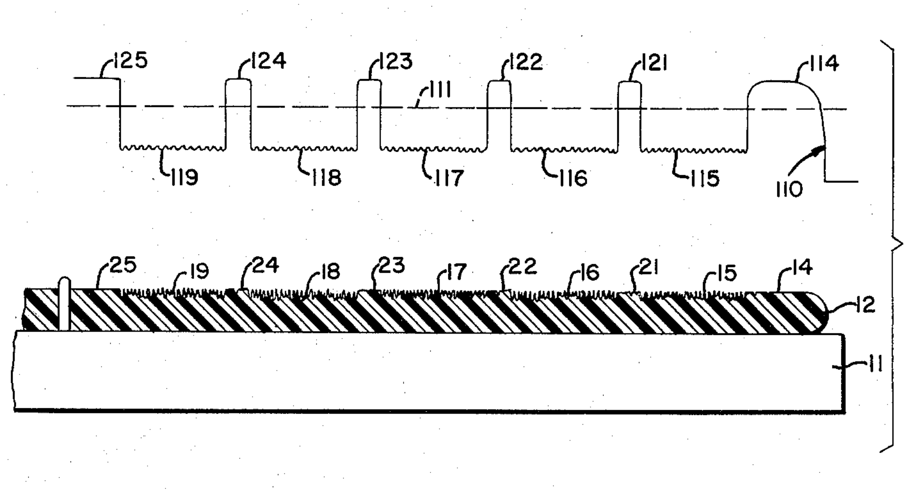
Fig. 5 is a fragmentary enlarged view in section of a phonograph record having a plurality of discontinuous sound tracks thereon and a graph of the voltage developed across a series resistor by the photoelectric cell current as the sound tracks are scanned thereby in successive order.

As the focused beam from the projector 29 moves across the unmodulated outer surface 14 of the record, the light reflected therefrom into the photoelectric cell 31 is of sufficient intensity to produce a photocell current which causes a voltage drop across resistor 112 as indicated at 114, on the graph 110 of Fig. 5. As the tone arm continues its inward travel to a position such that the first portion of the first modulated sound track 15 is scanned by the focused beam, the intensity of the light reaching the photocell is reduced due to the lower coefficient of reflection of the modulated surface and causes a corresponding reduction in the photocell current and, therefore, a reduction in voltage across the series resistor 112 to a value such as indicated on graph 110 by the numeral 115. The voltage required to be applied to the grid of the electronic tube 88, Fig. 6, to cause the tube to conduct a current of sufficient strength to actuate the stepping switch control relay 87 must be above the relay actuation level indicated by the dashed line 111 on graph 110. Since voltage 114 exceeds this level, the control relay 87 will remain in an operated condition as long as the beam of light impinges on the unmodulated portion 14 of the record. When the relay 87 is in its operated condition, armature 109 thereof, applies battery through the stepping magnet 79 causing the stepping switch armature 70 to operate against a ratchet tooth of the stepper switch 77 thereby moving the wiper arm 78 ahead one step into engagement with contact terminal 1 of the switch 77. As the beam of light moves on to the first modulated sound track 15 the reduction in voltage across resistor 112 to the value shown at 115 on graph 110 is sufficiently below the relay actuation level to cause release of relay 87. As armature 109 of relay 87 moves away from its contact, the circuit to stepping magnet 79 is interrupted and the stepping magnet releases, causing the stepping magnet armature 70 to be retracted into position for effecting the next step, the wiper arm being maintained on contact terminal 1 by the latching action of the reset magnet armature 90.

As the tone arm continues its swing toward the innermost portion of the record, the light beam advances from the first sound track to the unmodulated ring 21 resulting in an increase in the voltage as indicated on graph 110 by the numeral 121. This voltage is above the relay actuation level and consequently the relay 87 is again operated causing the wiper arm 78 of selector switch 77 to be advanced to engage the terminal 2 in the manner previously described.

As the beam of light advances to the second modulated sound track designated 16, the voltage across resistor 112 drops to a value indicated by the numeral 116 on graph 110 causing relay 87 to become deenergized and again release the stepping magnet armature 70 into position for the next step, with the latching armature 90 maintaining the wiper arm 78 in contact with terminal 2 of the stepper switch. As the beam of light continues its travel, it passes from the sound track 16 to the second unmodulated ring, designated 22, and resulting in an increase in the otuput voltage as indicated by numeral 122 on graph 110. This is above the actuation level 111 and again relay 87 is operated thereby operating the stepping magnet 79 and advancing the wiper arm contact of the stepping switch to contact terminal 3.

With wiper arm 78 in engagement with terminal 3 a circuit is completed from battery to the winding of control relay 86 and thence to ground which causes release relay 86 to operate and, by the action of armature 100 thereof, open the circuit to and deenergize the control relay 84 which releases and opens contacts 101—105 thereof. As contact 102 is opened, motor 46 is brought to rest thereby arresting further inward swing of the tone arm with the stylus in a position above the unmodulated portion 22 preceding the sound track desired for selection. As contact 103 opens, the circuit to solenoid 54 is interrupted and the arm 56 is rocked by spring 57 in a clockwise direction as viewed in Fig. 2 causing the driving wheel 51 to be moved upward and to become disengaged from the frustoconical surface of the arcuate portion of the tone arm. Concurrently therewith the tone arm is lowered to a playing position with the stylus thereof engaging the unmodulated portion 22 for guidance to the outermost convolution of the selected sound track. This downward movement of the tone arm, it will be noted, is retarded by a dash pot 42, Fig. 2, sufficiently to prevent damage to the record or the stylus as the stylus moves into engagement therewith. As contact 108 of relay 84 opens, the projector 29 is extinguished thereby preventing any additional counts from being made. As link 56 was moved by spring 57 to its initial position of rest the contacts of microswitch 71 were disengaged. It should be noted that the contact 102 of relay 84 is in series with the tone-arm-motor-start microswitch 71. With this arrangement the tone arm will not begin to rotate until it is fully raised thereby closing microswitch 71, but it will stop immediately upon the deenergizing of relay 84 although the microswitch 71 may still be maintained in a closed condition by tone arm inertia, maintaining contact between the bottom edge 99 of the tone arm and the roller 98 of microswitch 71 just prior to lowering of the tone arm. The selected sound track is now being traversed by the stylus and the sound track selection operation has been completed.

When the selected sound track has been played the reject button 68 is actuated thereby closing a circuit from battery BA, conductor 92, winding of reject relay 85, contacts of reject button 68, conductor 126, closed contact 107 of switch 75, contact of switch 73 to ground on conductor 95 thereby causing relay 85 to operate and contact 131, thereof, to establish a circuit in parallel with reject button 68 to maintain the relay operated after the reject button has been released. As armatures 134—135 move away from their respective break contacts into engagement with their respective make contacts, the power connections to the tone arm motor 46 are reversed in such manner that when ground is applied thereto at armature 132 of relay 85 through contact of microswitch 71, motor 46 will operate in the reverse direction to swing the tone arm outwardly towards its initial position. As contact 133 of relay 85 is closed, a circuit is completed to operate solenoid 54 and move the driving wheel 51 downwardly against the frustoconical surface 53 thereby raising the tone arm and establishing the driving connection therefor to tone arm motor 46 by the concurrent closing of microswitch 71. As armature 136 moves away from its break contact it additionally opens the circuit to the projector lamp 29, serving no useful purpose at this time. As armature 137 of relay 85 engages its make contact, reset magnet 81 of stepper switch 77 is operated thereby unlatching armature 90 thereof for sudden movement of contact wiper arm 78 reversely into engagement with stop 82 by spring 83.

When the tone arm reaches the extreme limit of its return swing, the tone arm engages microswitch 73, Figs, 3 and 6, causing the switch to be opened thereby. When this occurs, ground is removed from the locking circuit of relay 85 causing relay 85 to release. This opens contact 132 of the relay 85 thereby bringing the tone-arm-motor to rest and ending the return swing of the tone arm. As contact 133 of relay 85 opens, the solenoid 54 is deenergized. When this occurs, the driving wheel 51 is raised by spring 57, Fig. 2, and the tone arm, controlled thereby, is caused to be lowered. Contact 137 also opens to deenergize reset magnet 81 of the stepping switch 77, and restores the stepping switch to its initial counting condition. The armatures 134—135 of relay 85 restore the forward connection to the tone arm motor in preparation for moving the tone arm inwardly over the record, and the contact 136 closes making it possible to light the projector lamp when the start button is pressed for the next operation. It will be noted that when the tone arm is at the extreme limit of its return swing, it is directly above sloping cam surface 76 of tone arm rest 74 and as the tone arm engages this cam surface the tone arm is moved reversely thereby to a final rest position in engagement with surface 80 of tone arm rest 74 in such manner that when the tone arm is raised during a succeeding selection operation, switch 73 is not operated thereby. As the tone arm comes to rest on surface 80, the contacts 106 and 107 of microswitch 75 are opened thereby causing turntable motor 97 to be brought to rest and, at contact 107 thereof, to interrupt the connection between microswitch 73 and conductor 126, which prevents operation of the reset relay when the tone arm is in its initial rest position.

A selecting operation has now been completed and the tone arm has been returned to the initial rest position in readiness for another selection.

When a particular sound track is selected for playback and it is desired to play the next succeeding sound tracks on the record, the reject button 68 is not depressed when the first selected sound track has been played, as in the foregoing, and the succeeding sound tracks, therefore, are played as in a normal playback operation. When the last sound track has been played the tone arm moves to the innermost end of its swing, as shown in dashed outline 50 on Fig. 1, thereby closing contact 138 of microswitch 72 and causing reject relay 85 to operate and lock, thereby to restore the tone arm to its initial position on tone arm rest element 74, as previously described. As the tone arm moves away from its innermost position at the beginning of its return swing, contact 138 of microswitch 72 is opened, thereby enabling relay 85 to become deenergized when the tone arm has reached the extreme limit of its return swing and has opened microswitch 73.

If the selection and playback system should fail to complete a cycle of playback operation, such as would occur, for example, if the manual selector switch 66 should be set at a selection number higher than the number of modulated sound tracks on the record, the operator is apprised of this condition. To achieve this result there has been provided an alarm 89 which may be of any type suitable for the purpose such, for example, as an alarm light or buzzer to make this condition manifest, the operation of which will now be described.

Let it be assumed, by way of example, that the manual selector switch 66 was set to position 10, and let it further be assumed that the record from which the selection is to be made is provided with only 7 modulated sound tracks. As the tone arm scans the seven sound tracks and unmodulated spaces therebetween in successive order, in response to the operation of start switch 67, the stepping switch will be stepped ahead to contact 8 of the switch bank. Since no further impulses will be received from the photoelectric cell 31 the switch will remain at position 8 until restored by operation of reset magnet 81. Under these conditions relay 86 connected to wiper of manual switch 66 which, it will be recalled, is resting on contact 10, will not be operated. Start relay 84 will, therefore, remain operated, with make contact 105 closed, and the tone arm will continue its inward movement in its raised position. When the tone arm has been driven, by the motor 46, to the inner limit of its swing, it engages microswitch 72 which, it will be noted, is adapted to be engaged by the tone arm whether the tone arm is in a raised or lowered condition. When this occurs, contact 139 of microswitch 72 is closed thereby applying battery to make-contact 105 of relay 84, to the electroresponsive alarm 89 and thence to the alarm control switch 13, which is further assumed to be in a closed condition to ground on conductor 95, to give an alarm indication of an uncompleted selection. When the tone arm engages microswitch 72, contact 138, in parallel with the reject button, is concurrently closed and the normal reject operation, previously described, begins to restore the tone arm to the initial rest position. As the tone arm moves toward its initial rest position microswitch 72 becomes disengaged therefrom, contact 139 thereof opens, thereby retiring the alarm and contact 138 of the microswitch 72 also opens, thereby enabling relay 85 to become deenergized when the tone arm reaches the extreme limit of its return swing and momentarily opens microswitch 73. When microswitch 73 is opened, ground is removed from the locking circuits of relays 84 and 85 causing them to release. Release of relays 84 and 85 results in restoring the tone arm to its rest position as previously described. If for any reason the alarm is not desired, the switch 13 may be opened.

If it be assumed that a selection of 8 were made in the foregoing case of a record having 7 sound tracks only, the tone arm would be lowered in such position that the stylus would rest on the innermost unmodulated portion 25 of the record following the last sound track. No alarm would sound in this case, and the tone arm would be restored to the initial position in response to the operation of switch 72 as in a normal selecting operation.

When it is desired to play the first sound track of a record of any suitable diameter as in a conventional playback operation, the operator sets the selector knob on position 1 and then presses the start button. The tone arm will be raised and moved inwardly over the outer unmodulated surface 14, as in a normal selecting operation, coming to rest above surface 14 upon receiving the first photoelectric signal. The tone arm will therefore be in a position to be lowered and play the first sound track of the record regardless of the record diameter. In the event, that for any reason, the operator should decide to select a different sound track before a previous selection operation has been completed, the reject button may be operated to return the tone arm into the initial rest position.

On Fig. 7 is shown an alternative arrangement for controlling the operation of tube 88 in response to the different intensities of the reflected beam of light received from the surface of the record. In this arrangement the sensing mechanism responsive to the reflected light beam is a photoelectric cell designated by the numeral 143 which requires no external source of potential for its operation. In the arrangement of Fig. 7 one terminal of the photoelectric cell is connected to the grid control element of the tube 88 and the other terminal of the cell is connected to ground on conductor 95.

Whereas the invention has been described in detail with respect to a manual selector switch and a stepping switch, each having 10 selecting positions it will be understood that this has been done for the purpose of description and that one or both of these devices may have a greater or lesser number of settable positions without departing from the present invention. Furthermore, whereas the source of energy required for the operation of my system has been referred to therein as a battery, it will be understood that, if desired, this may be obtained from a rectified portion of the A.C. power supply and the voltage referred to herein as +B may be obtained from the A.C. line in like manner. Furthermore, whereas in the illustrated embodiment of the invention a hot cathode type of tube has been employed, a controlled semiconductor device may be employed in lieu thereof. In addition a photoelectric generator of the type which requires no external power source may be used to generate the input signal to the amplifier. Furthermore, whereas the beam of light is described as focused to a concentrated spot, it may take the form of a pencil beam of light.

Whereas the invention has been disclosed with reference to a particular example thereof which produces satisfactory results, it is not so limited as it will be apparent to one skilled in the art to which the invention pertains, after understanding the invention, that various changes and modifications may be made without departing from the spirit and scope of the invention, and it is my intention, therefore, in the appended claims to cover all such changes and modifications.

What is claimed as new and desired to be secured by Letters Patent of the United States is:

1. A phonograph having a turntable, a tone arm movable selectively from a position of rest to a playing position, said turntable being adapted to receive a record having a plurality of discontinuous sound tracks thereon, manually settable means including a plurality of contacts for selecting any one of said sound tracks for playback, a manually operated start switch, means connected to said start switch and controlled thereby for moving said tone arm from an initial rest position to a playing position with respect to a selected sound track as the start switch is operated, means carried by the tone arm for focusing a beam of light on the record as the tone arm moves thereacross during a scanning operation thereof, a photoelectric cell carried by the tone arm and controlled by the intensity of the beam of light reflected from the surface of the record as the focused beam moves across said surface during a scanning operation, a gated amplifier having the input thereof connected to said photoelectric cell for producing an output signal varying in strength in accordance with the intensity of said reflected beam, a relay connected to the output of said amplifier and operable when the strength of said output signal has increased to a value corresponding to an unmodulated portion of the surface of the record scanned by said cell, a stepping switch connected to said relay and operable thereby to different settings as the relay operates, said stepping switch having a plurality of bank contacts engageable in successive order and connected respectively to the contacts of said selecting means whereby a circuit from the stepping switch to the selecting means is established when the switch engages the contact corresponding to the setting of the selecting means, and means including a second relay in said circuit for lowering the tone arm into playing position with respect to the selected sound track when the circuit is established.

2. A phonograph according to claim 1 including means carried by the tone arm for producing said beam of light.

3. A phonograph according to claim 1 in which said gated amplifier comprises an electronic tube having the grid control element thereof connected to said photoelectric cell and the plate element connected to said first named relay.

4. A phonograph according to claim 1 in which said stepping switch includes a reset magnet for restoring the switch to normal following a selecting operation, means including a third relay for operating said reset magnet as the third relay operates, and contact means connected to said third relay and operable by the tone arm as the tone arm reaches the limit of inward movement thereof toward the center of the record for operating said third relay.

5. A phonograph having a turntable adapted to receive a record having a plurality of sound tracks formed thereon in successive order and a tone arm movable from a position of rest to a playing position, a tone arm rest element for supporting the tone arm in said position of rest, a contact on said rest element and opened by said tone arm when the tone arm is resting thereon, a settable manual selector having a plurality of contacts engageable selectively in accordance with the setting thereof, an electroresponsive counter connected to said contacts for establishing a circuit to a selected one of said contacts when the counter has counted a number of impulses corresponding to the setting of the manual selector, motor driven means for moving the tone arm from said position of rest to a playing position, a manually operable start switch having a start relay connected thereto and operable thereby as the switch is closed, circuit means including a plurality of switching connections between said start relay and the motor driven means for setting the motor into operation as the start relay is operated, means on said tone arm for producing a focused beam of light impinging on the surface of said record while the arm is moving inwardly with respect thereto, means responsive to the intensity of the light beam reflected from said record for producing electrical signals of different strength selectively in accordance with the intensity of the reflected beam as the light passes over modulated and unmodulated grooves comprising the discontinuous sound track portions of the record, means interconnecting the electrical signal producing means to said counter in a manner to actuate the counter as each electrical signal is applied thereto, means connected to said manual selector and effective when the counter had counted a number of said signals corresponding to the setting of the selector for releasing the start relay thereby to interrupt the operation of said motor and cause the tone arm to come to rest in a position to play a selected sound track, relay means for actuating said switching connections to the motor in a manner to reverse the direction of operation of the motor when the motor operating circuit is closed, a switch actuated by the tone arm at the completion of the inward movement thereof and connected to said relay means for actuating the relay means as the last named switch is closed, a solenoid device connected to normally open contacts of said switching means and operable thereby as said switching means is actuated, means actuated by said solenoid device for closing the operating circuit to said motor to cause the motor to operate reversely as the solenoid device operates thereby to move the tone arm reversely from the end of inward movement thereof to the initial position of rest, and means including a switch actuated by the tone arm as the tone arm moves to the outermost position thereof for releasing said relay means whereby said motor circuit is interrupted and the motor brought to rest.

6. A phonograph according to claim 5 including means for restoring the counter to an initial counting position, and an additional pair of contacts on said switching means for operating the counter restoring means as the switching means operates.

7. A phonograph according to claim 6 including a second pair of contacts on said rest element connected to the turntable motor of the phonograph in such manner as to be closed when the tone arm is disengaged therefrom and thereby set the turntable motor in operation.

8. In a phonograph, a record having a plurality of modulated sound tracks separated by annular unmodulated grooved portions, means for illuminating said sound tracks and grooved portions, photoelectric cell means for scanning said sound tracks and grooved portions alternately in successive order and producing control signals respectively corresponding to the intensity of the light rays reflected from said sound tracks and ground portions, and means connected to said photoelectric cell means for selecting a predetermined one of said sound tracks for playback.

9. A phonograph having a turntable adapted to receive a record having a plurality of mutually spaced sound tracks formed thereon in successive order and a tone arm movable from a position of rest to a playing position with respect to a selected sound track, means for setting the turntable and tone arm in operation, a plurality of selecting circuits, manipulative means for selecting one of said circuits corresponding to a sound track to be selected, means including a photoelectric device carried by the tone arm for scanning the record including the sound tracks thereon in successive order and producing electrical signals exceeding by one the number of sound tracks scanned, a stepping switch connected to said signal producing means in a manner to be operated thereby as each of said signals is produced, said stepping switch being connected to select said selecting circuits singly in successive order during operation thereof, and means including a control relay connected to said circuit selecting means for bringing the tone arm to rest in a position to play the selected sound track when the stepping switch has selected the circuit selected by said selecting means.

10. A phonograph having a tone arm and means for playing a record comprising a plurality of discrete sound tracks, photosensitive means for scanning said sound tracks in successive order during movement of the tone arm thereacross, and means including a relay connected to said photosensitive means and controlled thereby for playing a selected sound track of the record when a predetermined number of sound tracks has been scanned.

11. A device according to claim10 in which said photosensitive means for scanning the sound track comprises said tone arm, a light projector carried by the tone arm and having means for focusing a beam of light to a focal point on the surface of a record as the tone arm moves thereacross during a scanning operation, and a photoelectric cell carried by the tone arm in a manner to be actuated selectively by the intensity of a beam of light reflected from said focal point.

12. A device according to claim 11 including a pickup stylus, and means for adjusting the stylus to a predetermined position with respect to said focal point.

13. An electric phonograph comprising a turntable adapted to receive a record having a plurality of discrete sound tracks formed thereon and a tone arm movable from a position of rest to a playing position, a tone arm rest element having switch means thereon for setting the phonograph motor in operation as the tone arm is moved therefrom, means for moving the tone arm from said element to a playing position with respect to a selected sound track, means including a photoelectric device responsive to the intensity of a focused beam of light reflected from the surface of the record as the tone arm moves thereacross toward said selected position, means carried by the tone arm for focusing said beam of light on the surface of said record during a scanning operation of said tone arm, means connected to and controlled by said photoelectric device for bringing the tone arm to rest in a position to play a selected sound track when a predetermined number of variations in the intensity of said light have been reflected from the surface of the record, means including a switch actuated by the tone arm when the tone arm has moved to an innermost position with respect to said record for raising the tone arm from a playing position to a raised position and thereafter moving the tone arm reversely to an outermost position with respect to said record, a second switch engaged by the tone arm and operated thereby as the tone arm moves to said outermost position, means including a relay connected to said second switch for causing the tone arm to be lowered from said raised position and brought to rest against said rest element and cam means on said element for moving the tone arm away from said outermost position sufficiently to disengage said last named relay and effective during movement of the tone arm from the raised position to an initial position in engagement with said rest element whereby said last named switch is not operated during movement of the tone arm from the rest element to a playing position during a subsequent scanning operation.

14. A device according to claim 13 in which the means for moving the tone arm comprises a frustoconical surface formed on the tone arm with the axis thereof in coincidence with the axis about which the tone arm moves across the record, a driving wheel having a friction surface for engaging said frustoconical surface to establish a driving connection therebetween, said driving wheel being movable selectively from an initial position in disengagement with said frustoconical surface to a driving position in engagement therewith, said tone arm being moved by the driving wheel from a lowered position to a raised position while the frustoconical surface is engaged thereby, means for driving said driving wheel selectively in either direction, a solenoid for moving the driving wheel from said initial position to a driving position while the solenoid is operated, and means including a switch operated by the tone arm when the tone arm moves to a predetermined position with respect to the record for operating said solenoid.

15. In a phonograph, a tone arm, a turntable having a record thereon comprising discrete sound modulated and sound unmodulated portions formed thereon, means including a photoelectric cell for scanning said sound modulated and sound unmodulated portions of the record in successive order while the record is rotating and generating electrical signals corresponding in number to the portions thus scanned, said scanning means being carried by the tone arm in scanning relation to the record when the tone arm is in a raised position, means for raising said tone arm to said raised position, motor driven means for moving the tone arm across the record during a scanning operation while the tone arm is in said raised position, means connected to said scanning means and controlled thereby for stopping the motor thereby to bring the tone arm to rest in said raised position above a selected portion of the record when a predetermined number of said portions has been scanned, and means connected to said motor stopping means for lowering the tone arm to a playing position with respect to said selected portion of the record when the motor has been stopped.

References Cited in the file of this patent

UNITED STATES PATENTS 2,056,372 Schwartz ---------------- Oct. 6, 1936